(12) United States Patent
Hassell (10) Patent No.: US 6,625,114 B1
(45) Date of Patent: Sep. 23, 2003

(54) SYSTEM AND METHOD FOR CONNECTING EQUIPMENT THAT SUPPORTS ONLY PERMANENT VIRTUAL CIRCUITS TO A SWITCHED VIRTUAL CIRCUIT NETWORK

(75) Inventor: Suzanne Hassell, Clearwater, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/157,204

(22) Filed: Sep. 18, 1998

Related U.S. Application Data (60) Provisional application No. 60/077,973, filed on Mar. 13, 1998.

(51) Int. Cl.[7] .................................................. H04L 3/14
(52) U.S. Cl. .................. 370/216; 370/242; 370/395.63; 370/465
(58) Field of Search ................................ 370/389, 392, 370/397, 399, 465, 468, 466, 409, 216, 227–228, 242, 467, 395.63; 714/2, 4

(56) References Cited

U.S. PATENT DOCUMENTS 5,530,698 A * 6/1996 Kozaki et al.
6,021,130 A * 2/2000 Kozaki et al.
6,125,119 A * 9/2000 Chrukuri et al.
6,317,431 B1 * 11/2001 Hodgkinson et al.
6,421,337 B1 * 7/2002 Rao et al. .................... 370/351

* cited by examiner

Primary Examiner—Dang Ton
Assistant Examiner—Inder Pal Mehra
(74) Attorney, Agent, or Firm—Thomas, Kayden, Horstemeyer & Risley (57) ABSTRACT

A virtual circuit (PVC) to switched virtual circuit (SVC) conversion system and method are used for communication across SVC in parallel with VCs or in place of VCs set up to other sites on a network when communication problems exist such as congestion, node-to-node failures or any other instances in which increased bandwidth is needed or service pricing justifies it. The VC to SVC conversion system is used in a communications access device to allow Carriers providing SVC service to avoid having to upgrade or replace the customer's existing premises equipment to support SVCs. The system comprises logic which maps a VC to an SVC configured by the user during configuration, based on the VC address contained in the data link control identification in the frame layout of the data. This logic exists in the memory of the communications access device and is executed on a processor which may or may not be located inside the communications access device which controls a communications switch in accordance with criteria from the network management system. Use of the present invention will increase efficiency and cost effectiveness of communications access.

68 Claims, 4 Drawing Sheets

SYSTEM AND METHOD FOR CONNECTING EQUIPMENT THAT SUPPORTS ONLY PERMANENT VIRTUAL CIRCUITS TO A SWITCHED VIRTUAL CIRCUIT NETWORK

CROSS-REFERENCES TO RELATED APPLICATIONS

This application claims the benefit of U.S. Provisional Application No. 60/077,973, filed Mar. 13, 1998.

SEQUENCE LISTING

Not applicable.

STATEMENT AS TO ANY INVENTION RIGHTS UNDER FEDERALLY SPONSORED RESEARCH

Not applicable.

BACKGROUND OF THE INVENTION

The present invention generally relates to telecommunication networks, and more particularly to a system and method for providing carriers the ability to offer switched virtual circuit services to customers for frame relay communications.

Frame relay is a high performance, cost-effective means of connecting an organization's multiple LANs and systems network architecture (SNA) services through the use of various techniques. Like the old X.25 packet-switching services, frame relay uses the transmission links only when they are needed. Frame relay was created using the benefits of the switched network and the packet arrangements of previous networks.

Asynchronous Transfer Mode (ATM) is similar in concept to frame relay. Both take advantage of the reliability and fidelity of modem digital facilities to provide faster packet switching than X.25. ATM, at its higher data rate, is even more streamlined in its functionality than frame relay. ATM is a network technology capable of transmitting data, voice, video, and frame relay traffic in real time. Data, including frame relay data is broker into packets containing 53 bytes each, which are switched between two nodes in the system at rates ranging from 1.5 Mbps to 622 Mbps. ATM is defined in the broadband ISDN protocol at the levels corresponding to levels 1 and 2 of the ISO/OSI model, which are the physical layer and data-link layer. In computer networks, the physical layer is responsible for handling both the mechanical and electrical details of the physical transmission of a bit stream. At the physical layer, the communicating systems must agree on the electrical representation of a binary 0 and 1, so that when data are sent as a stream of electrical signals, the receiver is able to interpret the data properly as binary data. This layer is implemented in the hardware of the networking device. The data-link layer is responsible for handling the frames, or fixed-length parts of packets, including any error detection and recovery that occurs in the physical layer. Although this technology has traditionally been used in local area networks involving workstations and personal computers, it has now been adopted by telephone companies.

As is known, time-division multiplexed (TDM) circuit switching creates a full-time connection or a dedicated circuit for the duration of the connection, between any two attached devices. TDM divides the bandwidth into fixed time slots, that allow multi-channel communication. Specifically, multiple devices may communicate across a single physical line, by being assigned one of the TDM time slots. Unfortunately, when an attached device is not sending data the time slots remain empty, thereby wasting the use of the bandwidth. Hence, a higher speed device on the network can be slowed down or bottled up waiting to transmit data, but the capacity that sits idle cannot be allocated to this higher device for the duration of the transmission. Thus TDM is not well suited for burst data transmissions which are common.

As is further known, X.25 packet-switching was created to solve the limitations of the fixed bandwidth allocation of TDM circuit switching. X.25 packet switching allowed the bandwidth to be allocated on the fly. Instead of putting the data into a fixed time slot, the user data is broken down into smaller pieces called packets, each containing both the source and the destination addressing information, as well as other control functional information. When a-user sends data in a burst, multiple packets will be generated and routed across the network based on the address information contained in the packets. The network creates a virtual circuit between each source and destination to keep track of the packets on each connection. Multiple virtual circuits can be active on the same line. This form of multiplexing is called statistical time-division multiplexing (STDM). STDM uses the analyses of the past users to allocate more interleaved packet slots to the heavier users and less interleaved packet slots to the lighter users. Although guaranteed delivery and integrity was a prerequisite for the development of the X.25 networks, the major drawback to this scheme is the penalty paid in speed of delivery. Taking the features of the switched network and the packet arrangements, the network arrived at a frame relay service.

The increased need for speed across the network platforms within the end user and the carrier networks was one reason why frame relay was developed. The need for higher speeds has been driven in part by the move away from the original textbased services to the current graphics-oriented services and the bursty time-sensitive data needs of the user through new applications. The proliferation of LANs and client/server architectures that are being deployed have shifted the paradigm of computing platforms. To accommodate this new paradigm of availability, speed and reliability of communications between systems and services, reduced overhead associated with the network by eliminating some of the processing, mainly in the error detection and correction schemes were introduced. Frame relay was designed to take advantage of the network's ability to transport data on a low-error, high-performance digital network, and serve the needs of the intelligent synchronous applications of the newer and more sophisticated user applications. Analog transmission systems were extremely noisy and produced a significant amount of network errors and data corruption. Digital networks are much more dependable with respect to integrity of data transmissions.

Frame relay makes the design of the network much simpler than using a mesh of private leased lines. In frame relay, instead of having a costly private leased line between each site requiring communications requiring a large number of leased lines, frame relay access from each site is provided into a network cloud, requiring only a single connection point. Data transported across the network is interleaved on a frame-by-frame basis. Multiple sessions can be running on the same link concurrently. Communications from a single site to any of the other sites can be easily accommodated using the pre-defined network connections of virtual circuits. In frame relay, these connections use permanent logical links (PLL), more commonly referred to as permanent virtual circuits (PVC). In contrast, switched virtual circuits (SVC) are logical connections which are not permanent, but only established when data is to be transmitted. Each of the PVCs and SVCs connects two sites just as a private line would, but in this case the bandwidth is shared among multiple users, rather than being dedicated to one site for access to a single site. Using this multiple-site connectivity on a single link reduces the costs associated with customer premises equipment, such as CPU ports, router ports, or other connectivity arrangements.

When designing a frame relay service, the speed of access is important to manage, both prior to and after installation. First, customers ask a service provider to provision a PVC, if they plan to communicate through frame relay often. The PVC is used to communicate between two sites exclusively. The customer must select and be aware of the need for a specified delivery rate. There are various ways of assigning the speed, from both an access and from a pricing perspective. The flat rate service offers the speed of service at a fixed rate of speed. The pay-as-you-go service is usage-based and might include no flat rate service. The combined service is a mix of both offerings. The customer selects a committed information rate (CIR) at a certain speed. The committed information rate is a guaranteed rate of throughput when using frame relay. The CIR is assigned to each of the PVCs selected by the user. Each PVC should be assigned a CIR that is consistent with the average expected volume of traffic to the destination port. Because frame relay is a duplex service (data can be transmitted simultaneously in each direction), a different CIR can be assigned in each direction. This allows added flexibility to the customer's needs for transport. However, because LAN traffic is generally bursty, the CIR can be burst over and above the fixed rate for a period of less than two seconds at a time in some carrier networks. The variable PVC arrangement with differing CIRs is a flexible arrangement. However, care must be taken when customers use this arrangement because there is a fee associated the port on the switching node within the network that can be substantial.

As aforementioned, SVCs are not permanent. SVCs are used to communicate to a remote site in which the customer has not set up a PVC. SVCs can also be used along with PVCs for additional bandwidth. SVCs get signaled similar to X.25 packet switching and involves call setup and call takedown. An address is given to communications switches, such as frame relay switches, inside the network and the frame relay network will communicate and set up the path based on the address. When a PVC is provisioned the path from end-to-end is set up. In a SVC, the path can vary depending on changes that are made internal to the network. SVCs can therefore eliminate the need for a customer to set up a dedicated PVC to a site which is not communicated with often. Also, since SVCs can be used to communicate with various sites, it can eliminate the need for the customer paying for more bandwidth initially than is needed. Although SVCs are currently not very popular, systems are known which allow PVCs and SVCs to exist simultaneously on a single switch.

Over time, increasing CIR, PVC and port charges often offset the savings initially provided by migrating to frame relay. Frame relay access products are known to combat this erosion of savings through selective data compression, port aggregation and PVC multiplexing. In a system that does not rely on a router for compression or data prioritization, the router is less burdened, which can improve network performance. This can also displace the need to upgrade the router. A data link control identifier (DLCI) is a portion of a frame that marks the PVC addressing scheme thereby allowing customers to reduce the number of physical ports and share a single PVC for multiple data streams, including inband simple network management protocol (SNMP) management. All routers that provide frame relay interfaces can be configured to provide PVCs between the router and the frame relay access unit. However, some service providers provide SVC services which are advantageous in alleviating the problems with meshed and partially meshed networks, as well as disaster recovery when the PVC link between two sites fail, but implementation at the customer site requires additional hardware or upgrades to existing hardware and software. Routers are not generally adapted to handle SVCs and routers may come from many different vendors having many different architectures. Those routers that are adapted to handle SVCs are very costly. Another solution to the problem of CIR, congestion and disaster recovery currently is to have multiple PVCs. This is also costly to the customer and is often inefficient, when not fully or at least substantially utilized.

There is therefore a need in the industry for a method and apparatus for addressing these and other related problems.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method for mapping VCs that are seldom used from a router into SVCs of a service provider frame relay network, based on various criteria from system evaluation. In accordance with one aspect of the invention, the system establishes an SVC to aid or replace a PVC for communication upon request by the a site or upon adverse network conditions. The system provides for the mapping of DLCI(s) on the port side (router) to an address on the network side which corresponds to the destination unit. The destination unit is a router supporting SVCs or a frame relay access device which supports VC/SVC conversion.

According to an aspect of the invention, a VC/SVC conversion will occur upon detection of data on a VC from the router configured to be mapped to an SVC.

According to another aspect of the invention, a VC/SVC conversion will also occur upon receipt of a SVC call from the network that is configured to be mapped to a VC from the router.

According to yet another aspect of the invention, a VC/SVC conversion will occur during a specified time of day. The VC/SVC converter contains a timer which will set up and take down the SVC during certain times of the day when a VC is not available or is heavily used. The VC/SVC conversion may also occur when a VC fails or is otherwise unexplainably interrupted for a period of time. In this case, an SVC is activated as an alternate link for backup (disaster recovery).

The present invention has many advantages, a few of which are delineated hereinafter, as examples.

An advantage of the VC/SVC conversion system and method is that they allow a Carrier providing SVC service to avoid having to upgrade/replace the customer's existing premises equipment to support SVC.

Another advantage of the VC/SVC conversion system and method is that they allow the customer more bandwidth for communication on demand.

Another advantage of the VC/SVC conversion system and method is that they allow disaster recovery for VC links which fail to communicate.

Another advantage of the VC/SVC conversion system and method is that they provide load balancing of communication on VCs experiencing congestion or exceeding the CIR.

Another advantage of the VC/SVC conversion system and method is that they provide an alternate link of communication during a specific time of the day, when the user may need more bandwidth or the PVC is unavailable.

Another advantage of the VC/SVC conversion system and method is that they enable communication to remote sites which may not.be reachable by a VC.

Other features and advantages of the present invention will become apparent to one with skill in the art upon examination of the following drawings and detailed description. It is intended that all such additional features and advantages be included herein within the scope of the present invention, as is defined by the claims.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE INVENTION

Turning now to the drawings, wherein like reference numerals designate corresponding parts throughout these several figures. It should be well understood by those skilled in the art that some aspects of the present invention may be practiced on a variety apparatuses for the purposes of VC/SVC conversion.

Figure 1:
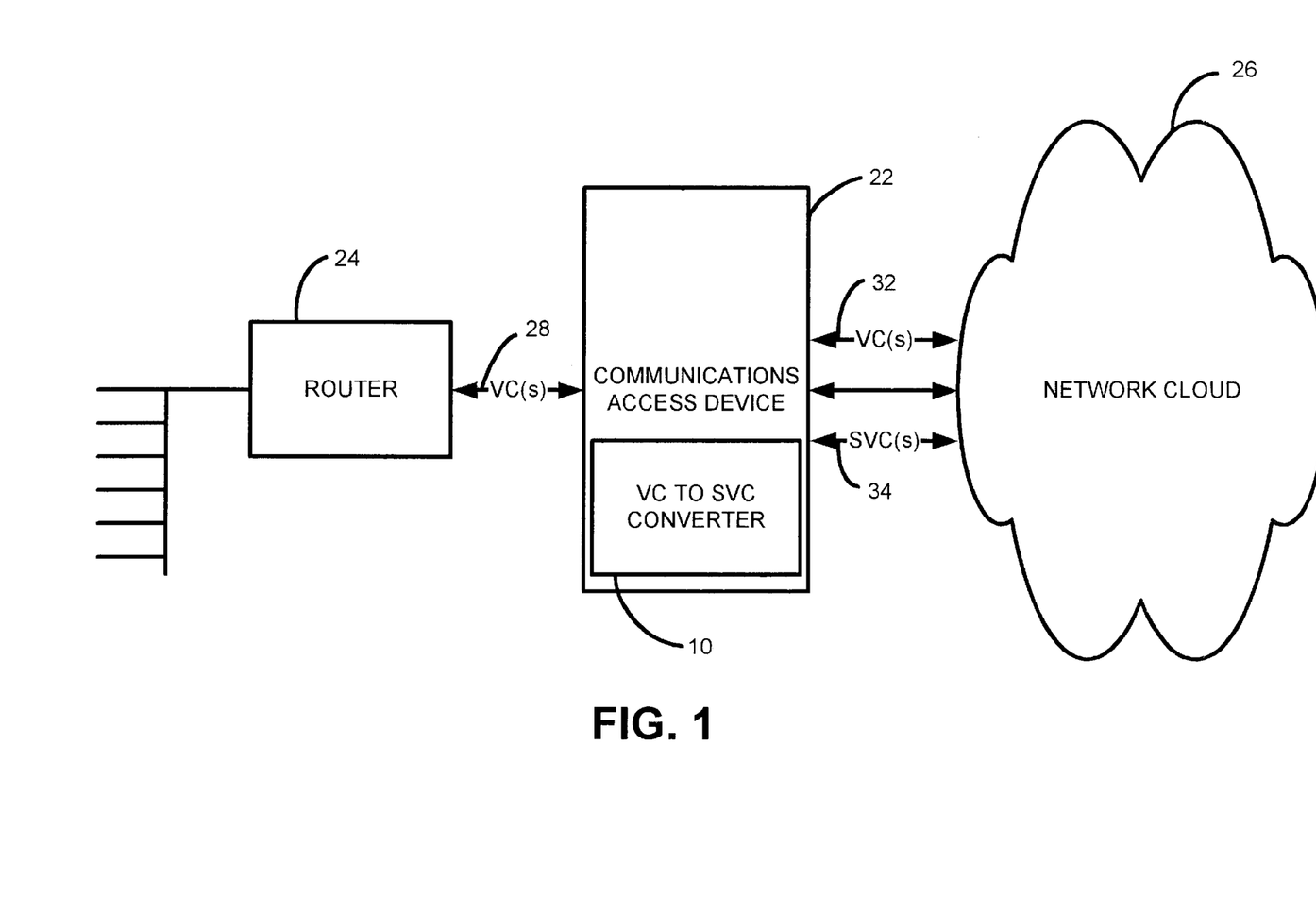
FIG. 1 is a block diagram showing the connection of the present invention existing in a frame relay access device connected between a router and a network cloud.

FIG. 1 is a diagram showing the connection of the present invention 10 between a router 24 and a network 26. The customer site is connected to a VC 28 through a router 24. The router 24 serves as an intermediary device on the communications network that expedites messages from computers on a network mesh to a communications access device 22. It should be understood that the communications access device may include, but is not limited to a frame relay access device and that VC 28 may include but is not limited to permanent virtual circuits as is the case in the frame relay communications system. It should also be understood by those of ordinary skill that there may exist multiple VCs 28 connected to the communications access device 22 which may be mapped to a single SVC or a limited pool of SVCs. In such case, some sort of prioritization scheme may be implemented for VC to SVC access. Within this communications access device 22 is the system and method of the present invention 10 for mapping the VC 28 to an available SVC 34. At system configuration, the customer configures the addresses for the SVCs 34 and the mapping of these SVCs 34 to the VCs 28 from the router 24. If the address of the site denoted by the DLCI in a transmission from the router 24 is a site with which a customer plans to frequently communicate, then the signal is routed through a VC 32 to a destination on the network 26 as is typically done today. If the address of the site denoted by the DLCI in a transmission from the router 24 is a remote site or a site of infrequent communication, the signal is routed through an SVC 34 by the present invention to a destination on the network 26.

Figure 2:
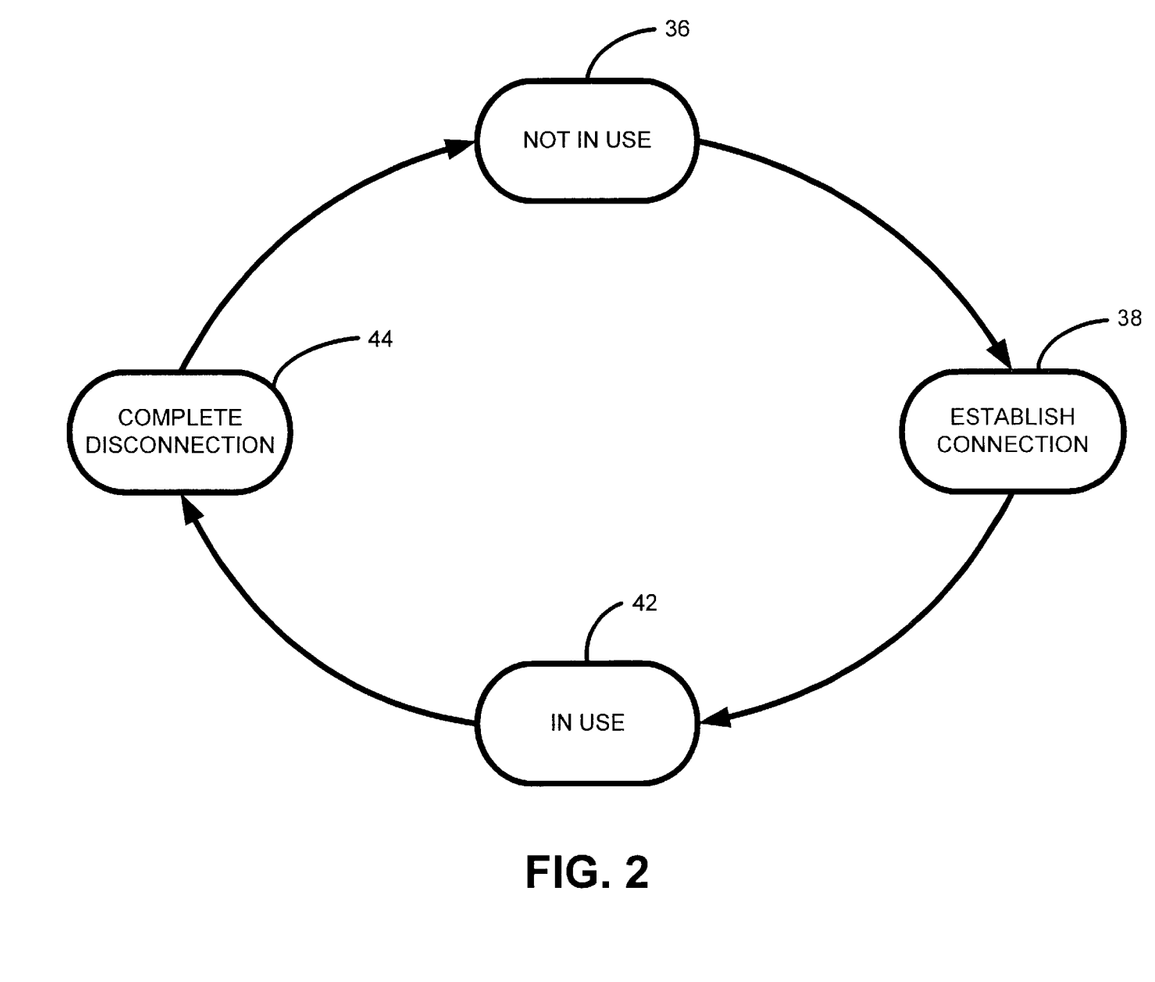
FIG. 2 is a SVC state diagram of the present invention of represented in FIG. 1.

FIG. 2 is a state diagram of a SVC. The VC 28 is always presented as active to the router 24 when a VC 28 is mapped to a network SVC 32. The SVC 34 is activated only when called upon as a result of some condition. This condition changes the SVC state from "NOT IN USE" 36 to "ESTABLISH CONNECTION" 38. Such condition criteria include, but are not limited to activity detected on the VC 28 from the router to be mapped to the SVC 34 once established, signaling from the network to set up the SVC implying that a remote unit wants to communicate, a predetermined time of day, when congestion is detected on a network VC 32 or when more bandwidth is needed. When a predetermined condition is met, a connection is established via SVC call setup signaling, in which the VC 28 from the router is mapped to the SVC 34 for communication between two sites. This connection remains established 38 and is "IN USE" 42 until yet another predetermined condition is met. This condition will transition the SVC state to "COMPLETE DISCONNECTION" 44. This condition may include, but is not limited to, inactivity across the SVC for a predetermined amount of time or disconnection of the remote end. When a disconnection condition is met, the SVC is "taken down" through network signaling to close the connection and is unmapped to the VC, and remains the unused 36 until another "ESTABLISH CONNECTION" 38 condition is met.

Figure 3:
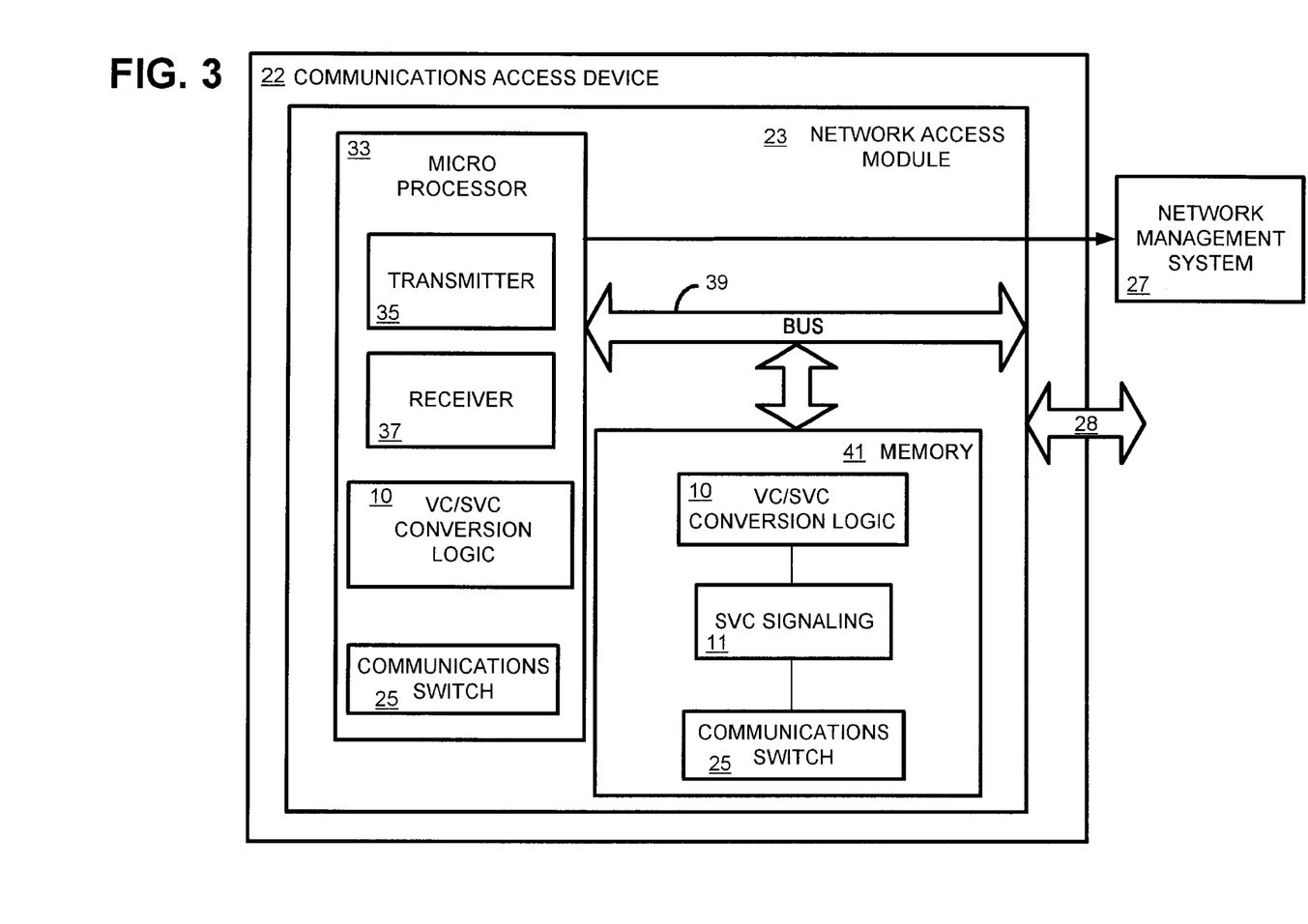
FIG. 3 is a schematic view illustrating a communication device in which the VC/SVC conversion logic resides within the frame relay access device of FIG. 1.

Turning now to FIG. 3, a block diagram of a communications access device 22 is shown in which the VC/SVC converter 10 resides. The communications access device 22 contains a number of conventional components that are well known in the art of data communications. Network access module (NAM) 23 includes a microprocessor 33 which is configured to control the operation of the communications access device's transmitter 35 and receiver 37, and is configured to couple to memory 41 over a bus 39. Access to VCs 28 is provided by NAM 23.

Contained within memory 41 is the VC/SVC conversion logic 10. VC/SVC conversion logic 10 is configured to enable and drive the microprocessor 33 to allow the detection of transmitted data received from the router 24 (FIG. 1), acquire the DLCI, compare the address information of the DLCI with the VC/SVC address mapping information provided by the customer at configuration, check the state of an SVC 34 (FIG. 1) and transmit data across the appropriate SVC 34 (FIG. 1) using the configured E.164 or X.121 destination address using the Communications switch 25. SVC 34 (FIG. 1) is signaled via SVC signaling 11 before a connection is established. SVC call control 62A, SVC security 62B and SVC prioritization 62C is implemented within the VC/SVC conversion logic 10 addressed in detail hereinafter.

The VC/SVC conversion program 10 of the present invention can be implemented in hardware, software, firmware, or a combination thereof. In the preferred embodiment(s), the VC/SVC conversion program 10 is implemented in software or firmware that is stored in memory 41 and that is executed by a suitable instruction execution system.

The VC/SVC conversion program 10, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a memory 41.

Figure 4:
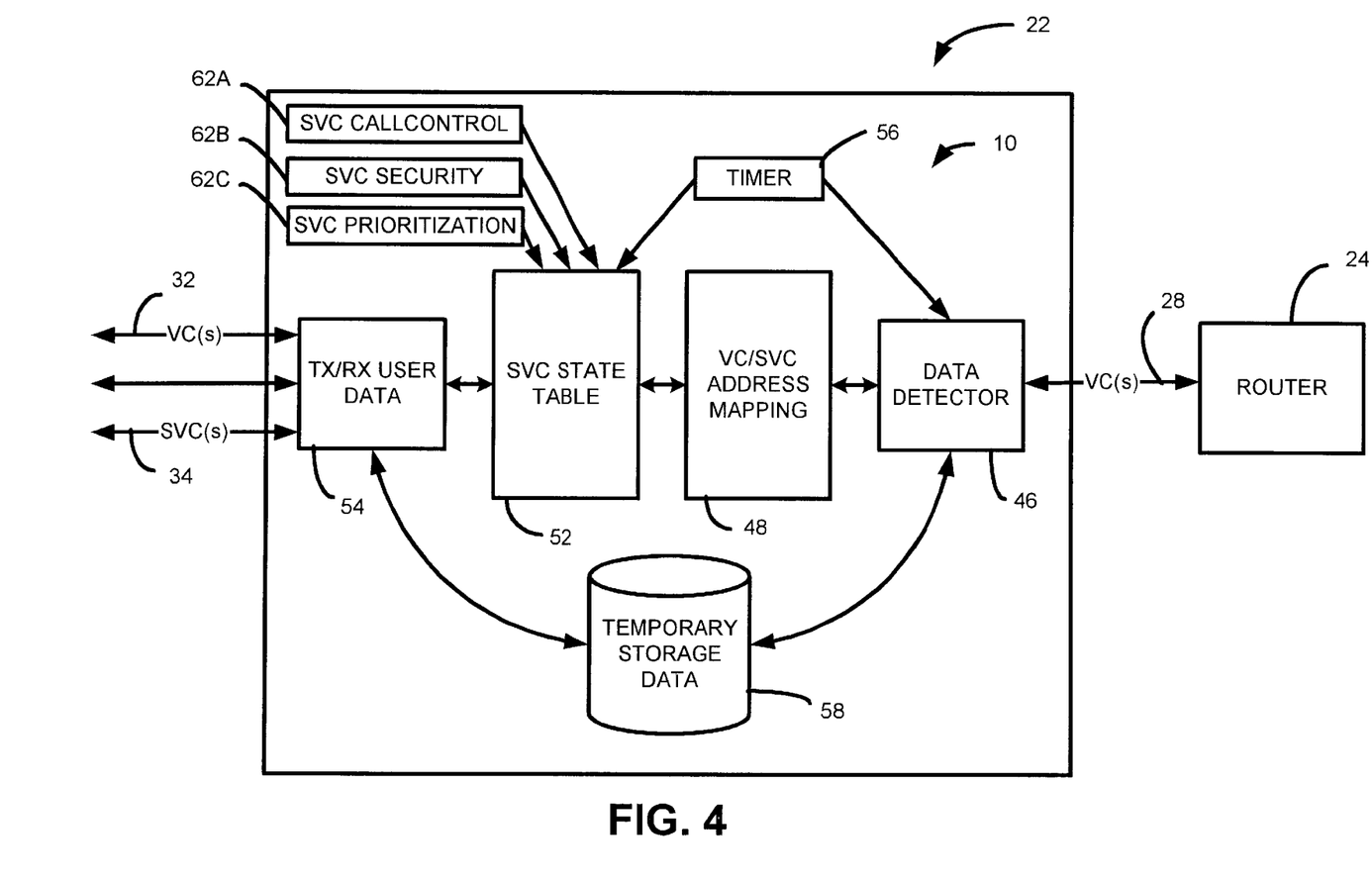
FIG. 4 is a block diagram of the present invention as it exists in the frame relay access device of FIG. 1.

FIG. 4 is a block diagram of the present invention 10 showing the functional modules of the present invention 10 as it exists in the communications access device 22 depicted in FIG. 3. Data, containing a DLCI is detected by the data detector 46 of the VC to SVC converter 10 from the router 24. From the data detector 46, the DLCI is mapped to a particular E.164 or X.121 destination address via the VC/SVC address mapping system 48. After mapping the data from a VC to an E.164 or X.121 destination address, the state of the address destination is checked via the SVC state table 52. If an SVC 34 is connected to a the destination, the data is then transmitted by a transmit/receive circuit 54. A timer 56 is provided to detect whether a signal has been received or not for a predefined amount of time. If not, then the SVC 34 is taken down and the connection to the receiving site is discontinued. Internal security to the network is also present via SVC call control 62A, SVC security 62B and SVC prioritization 62C. It is possible for some security to occur based on some criteria such as caller ID or password exchange. In an alternate embodiment of the present invention, additional security is provided standard to such interfaces such as with ISDN. Additionally, temporary storage 58 is provided for storing data to be switched when the SVC connection is established. Also, prioritization is performed if all SVCs are busy. One destination may take priority over another destination resulting in the termination of a connection or the ignoring of a current SVC call for connection to a remote site. When data is detected by the data detector 46, a delay is necessary to allow SVC signaling 11 (FIG. 3) and connection to occur via SVC call control 62A, SVC security 62B and SVC prioritization 62C.

Using the present invention gives the communications access device 22 the capabilities of mapping seldom used VCs 28 into SVCs 34 to the service provider. This is accomplished by evaluating various criteria, included, but not limited to: 1) bandwidth on demand configuration where the VC 28 is always presented to the router 24 as active, but the SVC call is only placed upon receiving data from the router 24 on that particular VC 28; 2) time of day configuration in which the VC 28 is presented to the router 24 as active only at certain times of the day. In this instance, customers do not intend to use these VCs 28 very often, hence, they are provisioned as SVCs and the present invention 10 maps those between VCs 28 and SVCs 34. Additionally, a single SVC 34 or pool of SVCs may be shared by multiple VCs 28 from the router 24 requiring mapping between a VC 28 and a unique E.164 or X.121 destination address for the SVC 34. A prioritization scheme would then be used via SVC prioritization 62C. This is configurable by the customer. This configuration can be used to support video applications, voice over frame relay and other applications characterized by bursty and infrequent data, as well as file uploading/downloading, full mesh networks or disaster recovery. VCs 28 from the router 24 which are mapped to VCs 32 on the network 26 that are experiencing congestion, exceeding the CIR by a predetermined level, or experience some other throughput threshold amount could have a parallel call made on an SVC 34. The data throughput load would then be balanced over both the VC 32 and SVC 34 by either the communications access device 22 or by the router 24 using TCP/IP, or the VC 32 could be unused instead using the SVC 34 exclusively for a short time. The present invention may also provide an SVC 34 for communication when a particular VC 32 becomes inactive, in which case the SVC 34 will be activated as an alternate link for backup purposes (disaster recovery).

In concluding the detailed description, it should be noted that it will be obvious to those skilled in the art that many variations and modifications can be made to the preferred embodiment without substantially departing from the principles of the present invention. All such variations are intended to be included herein within the scope of the present invention, as set forth in the following claims.

We claim:

1. An apparatus at a customer premises site for communicating data across a network using a packet switching protocol, comprising:

at least one identifier being carried with the data to identify the data as belonging to at least one first virtual circuit, the at least one identifier being carried with the data on at least part of the at least one first virtual circuit;

a first port for communicating said data, the first port comprising the at least one first virtual circuit that is statistically multiplexed on the first port to carry the data, the first port providing connectivity to a customer premises equipment;

a second port for communicating said data, the second port comprising at least one switched virtual circuit that is statistically multiplexed on the second port to carry the data, the second port providing connectivity to said network;

a processor; and a memory containing a first code segment for execution by said processor, said first code segment configured to connect said first port comprising said at least one first virtual circuit communicating said data with said second port comprising said at least one switched virtual circuit for communicating said data across said network to a destination, said first code segment configured to connect the at least one first virtual circuit in said first port with the at least one switched virtual circuit in said second port based at least upon a detection of a condition, the at least one first virtual circuit being presented as active on the first port for carrying the data prior to communication of an SVC call setup signaling message between the apparatus and the network, the SVC call setup signaling message for call control to activate the at least one switched virtual circuit in the second port for carrying the data between the apparatus and the network, the SVC call setup signaling message and the condition being causally related.

2. The apparatus as defined in claim 1, wherein said apparatus further comprises at least one second virtual circuit, which provides connectivity at least between the apparatus and the network.

3. The apparatus as defined in claim 2, wherein said at least one second virtual circuit is a permanent virtual circuit.

4. The apparatus as defined in claim 2, wherein said at least one second virtual circuit is a switched virtual circuit.

5. The apparatus as defined in claim 2, wherein the second port of the apparatus comprises the at least one second virtual circuit.

6. The apparatus as defined in claim 2, wherein the condition includes performance of data communications to be carried on the at least one second virtual circuit and across said network.

7. The apparatus as defined in claim 6, wherein said performance of data communications to be carried on the at least one second virtual circuit and across the network includes network congestion.

8. The apparatus as defined in claim 6, wherein said performance of data communications to be carried on the at least one second virtual circuit and across the network includes communication failure.

9. The apparatus as defined in claim 6, wherein said performance of data communications to be carried on the at least one second virtual circuit and across the network includes the availability of said at least one second virtual circuit for carrying data to be communicated across the network.

10. The apparatus as defined in claim 1, wherein the memory further includes a switched virtual circuit state table.

11. The apparatus of claim 10 wherein the switched virtual circuit table comprises a mapping between the at least one identifier for the at least one first virtual circuit and a network address.

12. The apparatus of claim 11, wherein the network address is an X.121 address.

13. The apparatus of claim 11, wherein the network address is an E.164 address.

14. The apparatus as defined in claim 1, further including a second code segment stored in said memory and executed by said processor configured to connect said at least one first virtual circuit to said at least one switched virtual circuit at least based on the detection of the condition of activity of said data on said at least one first virtual circuit, said data to be communicated across said network.

15. The apparatus as defined in claim 14, wherein the activity of said data on said at least one first virtual circuit excludes signaling communicated between the customer premises equipment and the apparatus to activate the at least one first virtual circuit between the customer premises equipment and the apparatus because the at least one first virtual circuit is presented as active on the first port for carrying the data prior to communication of the SVC call setup signaling message between the apparatus and the network.

16. The apparatus as defined in claim 14 wherein said second code segment is further configured to connect said at least one first virtual circuit to said at least one switched virtual circuit based at least on time of day.

17. The apparatus as defined in claim 1, further including a third code segment stored in said memory and executed by said processor configured to connect one first virtual circuit of said at least one first virtual circuit to a single switched virtual circuit of said at least one switched virtual circuit based on a priority scheme utilized to handle a plurality of first virtual circuits of said at least one first virtual circuit sharing said single switched virtual circuit and to handle at least two first virtual circuits of said plurality of first virtual circuits requesting a connection to said single switched virtual circuit.

18. The apparatus as defined in claim 1, wherein the condition includes a committed information rate of data throughput.

19. The apparatus as defined in claim 1, wherein the SVC call setup signaling message is an incoming SVC call setup signaling message from said destination that causes the condition.

20. The apparatus as defined in claim 1, wherein said destination is a remote site.

21. The apparatus as defined in claim 1, wherein said at least one identifier for the at least one first virtual circuit contains a virtual circuit addressing scheme.

22. The apparatus as defined in claim 1, wherein said at least one first virtual circuit is a permanent virtual circuit.

23. The apparatus of claim 1, wherein the at least one first virtual circuit is already presented as active on the first port for carrying the data prior to communication of the SVC call setup signaling message between the apparatus and the network such that signaling does not have to be communicated between the customer premises equipment and the apparatus contemporaneously with the SVC call setup signaling message to make the at least one first virtual circuit active.

24. The apparatus of claim 1, wherein the packet switching protocol is a virtual-circuit packet switching protocol.

25. The apparatus as defined in claim 24, wherein said virtual-circuit packet switching protocol is frame relay and the at least one identifier is at least one data link control identifier.

26. The apparatus as defined in claim 24, wherein said virtual-circuit packet switching protocol is asynchronous transfer mode.

27. The apparatus as defined in claim 24, wherein said virtual-circuit packet switching protocol is X.25.

28. The apparatus as defined in claim 1, wherein the condition causes the apparatus to generate the SVC call setup signaling message for communication to the network.

29. The apparatus as defined in claim 1, wherein said at least one first virtual circuit is a switched virtual circuit.

30. A method at a customer premises site of communicating data across a network using a packet switching protocol, comprising the steps of:
   first communicating of said data across a first virtual circuit through a first port of a communications access device, the first virtual circuit being statistically multiplexed on the first port to carry the data, the first virtual circuit connected between the communications access device and a customer premises equipment;
   determining a virtual circuit addressing scheme that is carried with said data on at least part of the first virtual circuit;
   connecting said first port connected to said first virtual circuit with a second port connected to a second virtual circuit based at least on a virtual circuit/switched virtual circuit address mapping, the second virtual circuit being statistically multiplexed on the second port to carry the data, the virtual circuit/switched virtual circuit address mapping being further based at least upon detection of a condition, the first virtual circuit being presented as active on the first port for carrying the data prior to communication of an SVC call setup signaling message between the communications access device and the network, the SVC call setup signaling message for call control to activate the second virtual circuit in the second port for carrying the data between the communications access device and the network, the SVC call setup signaling message and the condition being causally related; and
   second communicating of said data across said second virtual circuit based on the virtual circuit/switched virtual circuit address mapping from said second port to a receiving node on said network.

31. The apparatus of claim 30, wherein the first virtual circuit is already presented as active on the first port for carrying the data prior to communication of the SVC call setup signaling message between the communications access device and the network such that signaling does not have to be communicated between the customer premises equipment and the communications access device contemporaneously with the SVC call setup signaling message to make the first virtual circuit active.

32. The apparatus of claim 30, wherein the packet switching protocol is a virtual-circuit packet switching protocol.

33. The method as defined in claim 32, wherein said virtual-circuit packet switching protocol is frame relay.

34. The method as defined in claim 32, wherein said virtual-circuit packet switching protocol is asynchronous transfer mode.

35. The method as defined in claim 33, wherein said first virtual circuit and said second virtual circuit are permanent virtual circuits.

36. The apparatus as defined in claim 32, wherein said virtual-circuit packet switching protocol is X.25.

37. The method as defined in claim 30, wherein said second communicating step further includes:
   third communicating of said data across a switched virtual circuit through said second port based on said connecting step mapping said first port connected to said first virtual circuit to said second port containing said switched virtual circuit.

38. The method as defined in claim 37, further comprising the step of:
   determining the state of said switched virtual circuit before communicating across said second port connected to said switched virtual circuit based on the virtual circuit/switched virtual circuit address mapping of said connecting step.

39. The method as defined in claim 30, wherein said second communicating step further includes:
   prioritizing said connecting step based on a priority scheme responsive to a plurality of said first ports requesting a connection with the same said second port.

40. The method as defined in claim 39, wherein said determining step includes:
   determining a rate of throughput of said data; and
   comparing said rate of throughput of said data with a committed information rate of data throughput.

41. The method as defined in claim 39, wherein said determining step includes:
   determining network congestion.

42. The method as defined in claim 39, wherein said determining step includes:
   determining a communication failure has occurred.

43. The method as defined in claim 39, wherein said determining step includes:
   determining said second virtual circuit from said second port is unavailable.

44. The method as defined in claim 30, wherein said second communicating step includes:
   third communicating of said data across said second virtual circuit through said second port based on said connecting step mapping between said first port connected to said first virtual circuit and said second port containing said second virtual circuit.

45. The method as defined in claim 30, further comprising the step of:
   determining network performance based on an evaluation of network criteria.

46. The method as defined in claim 30, further comprising the step of:
   determining user demand of said connecting step.

47. The method as defined in claim 46, wherein said user demand includes said connecting step at a specific time of day.

48. A method at a customer premises site of communicating data across a network using a packet switching protocol, comprising the steps of:
   first communicating of said data across a first virtual circuit through a first port of a communications access device, the first virtual circuit being statistically multiplexed on the first port to carry the data;
   determining a virtual circuit addressing scheme carried with said data on at least part of the first virtual circuit;
   determining that a second virtual circuit is unavailable, the second virtual circuit for providing connectivity at least between the communications access device and the network using statistical multiplexing to carry the data;
   connecting said first port connected to said first virtual circuit with a second port of the communications access device, the second port further connected to a switched virtual circuit based on a virtual circuit/switched virtual circuit destination address mapping responsive to determining that the second virtual circuit is unavailable, the switched virtual circuit being statistically multiplexed on the second port; and
   second communicating of said data across a switched virtual circuit through said second port to a receiving node on said network.

49. The method of claim 48, wherein the packet switching protocol is a virtual-circuit packet switching protocol.

50. The method as defined in claim 49, wherein said virtual-circuit packet switching protocol is frame relay.

51. The method as defined in claim 49, wherein said virtual-circuit packet switching protocol is asynchronous transfer mode.

52. The method as defined in claim 49, wherein said virtual-circuit packet switching protocol is X.25.

53. The method as defined in claim 48, wherein the first virtual circuit and the second virtual circuit are permanent virtual circuits.

54. The method as defined in claim 48, wherein the first virtual circuit and the second virtual circuit are switched virtual circuits.

55. An apparatus at a customer premises site for communicating data across a network using a packet switching protocol, comprising:

- at least one identifier being carried with the data to identify the data as belonging to at least one first virtual circuit, the at least one identifier being carried with the data on at least part of the at least one first virtual circuit;
- a first port for communicating said data, the first port comprising the at least one first virtual circuit that is statistically multiplexed on the first port to carry the data, the first port providing connectivity to a customer premises equipment;
- a second port for communicating said data, the second port comprising at least one switched virtual circuit that is statistically multiplexed on the second port to carry the data, the second port providing connectivity to said network;
- a processor; and
- a memory containing a first code segment for execution by said processor, said first code segment configured to connect said first port comprising said at least one first virtual circuit communicating said data with said second port comprising said at least one switched virtual circuit for communicating said data across said network to a destination, said first code segment configured to connect the at least one first virtual circuit in said first port with the at least one switched virtual circuit in said second port based at least upon a detection of an occurrence of a condition, the at least one first virtual circuit being presented as inactive on the first port for carrying the data prior to the occurrence of the condition, the condition occurring without being caused by an SVC call setup signaling message, the at least one first virtual circuit being presented as active on the first port for carrying the data responsive to detection of the occurrence of the condition.

56. The apparatus of claim 55, wherein the occurrence of the condition is based on a time of day.

57. The apparatus of claim 56, wherein the packet switching protocol is a virtual-circuit packet switching protocol.

58. The apparatus as defined in claim 57, wherein said virtual-circuit packet switching protocol is frame relay and the at least one identifier is at least one data link control identifier.

59. The apparatus as defined in claim 57, wherein said virtual-circuit packet switching protocol is asynchronous transfer mode.

60. The apparatus as defined in claim 57, wherein said virtual-circuit packet switching protocol is X.25.

61. The apparatus as defined in claim 56, wherein the memory further includes a switched virtual circuit state table.

62. The apparatus of claim 61, wherein the switched virtual circuit table comprises a mapping between the at least one identifier for the at least one first virtual circuit and a network address.

63. The apparatus of claim 62, wherein the network address is an X.121 address.

64. The apparatus of claim 62, wherein the network address is an E.164 address.

65. The apparatus as defined in claim 56, wherein said destination is a remote site.

66. The apparatus as defined in claim 56, wherein said at least one identifier for the at least one first virtual circuit contains a virtual circuit addressing scheme.

67. The apparatus as defined in claim 56, wherein said at least one first virtual circuit is a permanent virtual circuit.

68. The apparatus as defined in claim 56, wherein said at least one first virtual circuit is a switched virtual circuit.

\* \* \* \* \*